(12) United States Patent
Yabuki

(10) Patent No.: US 10,642,864 B2
(45) Date of Patent: May 5, 2020

(54) INFORMATION PROCESSING DEVICE AND CLUSTERING METHOD

(71) Applicant: NEC Corporation, Tokyo (JP)

(72) Inventor: Kentarou Yabuki, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 320 days.

(21) Appl. No.: 15/126,316

(22) PCT Filed: Mar. 3, 2015

(86) PCT No.: PCT/JP2015/001101
§ 371 (c)(1),
(2) Date: Sep. 15, 2016

(87) PCT Pub. No.: WO2015/141157
PCT Pub. Date: Sep. 24, 2015

(65) Prior Publication Data
US 2017/0083605 A1    Mar. 23, 2017

(30) Foreign Application Priority Data
Mar. 18, 2014 (JP) .................................. 2014-054451

(51) Int. Cl.
*G06F 16/28* (2019.01)
*G06F 16/23* (2019.01)
(Continued)

(52) U.S. Cl.
CPC ............ *G06F 16/285* (2019.01); *G06F 16/23* (2019.01); *G06K 9/4633* (2013.01); *G06K 9/622* (2013.01); *G06K 9/6247* (2013.01); *G06K 9/6285* (2013.01)

(58) Field of Classification Search
USPC .................................. 707/737; 382/103, 224
See application file for complete search history.

(56) References Cited

U.S. PATENT DOCUMENTS

2009/0087104 A1*  4/2009  Nakate ............. G06F 17/30265
                                                    382/224
2012/0288149 A1* 11/2012  Kido .................. G06K 9/00825
                                                    382/103
(Continued)

FOREIGN PATENT DOCUMENTS

JP    10-198789 A    7/1998
JP    2003-242160 A  8/2003
(Continued)

OTHER PUBLICATIONS

Ryohei Fujimaki, et al., "The Most Advanced Data Mining of the Big Data Era", NEC Technical Journal, NEC Corporation, Sep. 2013, pp. 81-85, vol. 65, No. 02/2012.
(Continued)

*Primary Examiner* — Hung T Vy
(74) *Attorney, Agent, or Firm* — Sughrue Mion, PLLC

(57) ABSTRACT

Fast classification of data can be performed according to characteristics. In a clustering device (100), a data storage unit (300) stores a plurality of data sets. A cluster generation unit (400) generates an approximate line that approximates as many data sets as possible within a predetermined margin of error among the plurality of data sets in a space in which the plurality of data sets are arranged in accordance with data values. The cluster generation unit (400) generates a cluster by classifying the plurality of data sets based on the generated approximate line and outputs the generated cluster.

16 Claims, 8 Drawing Sheets

(51) Int. Cl.
    *G06K 9/62*     (2006.01)
    *G06K 9/46*     (2006.01)

(56) References Cited

U.S. PATENT DOCUMENTS

2013/0063789 A1*  3/2013  Iwayama .................. G06T 7/00
                                                    358/449
2014/0093177 A1*  4/2014  Hayashi ............... G06K 9/4604
                                                    382/199

FOREIGN PATENT DOCUMENTS

| JP | 2009-99120 A   | 5/2009 |
| JP | 2011-133988 A  | 7/2011 |
| JP | 2013-8289 A    | 1/2013 |
| JP | 5141789 B2     | 2/2013 |
| WO | 2013/128789 A1 | 9/2013 |

OTHER PUBLICATIONS

Ryohei Fujimaki, et al., "The Most Advanced Data Mining of the Big Data Era", NEC Technical Journal, NEC Corporation, Sep. 2013, pp. 91-95, vol. 7, No. 02/2012.
International Search Report of PCT/JP2015/001101, dated May 26, 2015. [PCT/ISA/210].
Written Opinion of PCT/JP2015/001101, dated May 26, 2015. [PCT/ISA/237].

* cited by examiner

Fig. 4

| DATA TYPE X (INPUT) | | DATA TYPE Y (CPU UTILIZATION RATE) | |
|---|---|---|---|
| TIME | DATA | TIME | DATA |
| 2014/02/01 00:00 | $x_0$ | 2014/02/01 00:00 | $y_0$ |
| 2014/02/01 02:00 | $x_1$ | 2014/02/01 02:00 | $y_1$ |
| ⋮ | ⋮ | ⋮ | ⋮ |
| 2014/02/01 22:00 | $x_{11}$ | 2014/02/01 22:00 | $y_{11}$ |
| 2014/02/02 00:00 | $x_{12}$ | 2014/02/02 00:00 | $y_{12}$ |
| ⋮ | ⋮ | ⋮ | ⋮ |
| 2014/02/02 22:00 | $x_{23}$ | 2014/02/02 22:00 | $y_{23}$ |

Fig. 5

| DATA COMBINATION | X | Y |
|---|---|---|
| $s_0$ | $x_0$ | $y_0$ |
| $s_1$ | $x_1$ | $y_1$ |
| ⋮ | ⋮ | ⋮ |
| $s_{23}$ | $x_{23}$ | $y_{23}$ |

Fig. 7

501 CLUSTER INFORMATION

| CLUSTER | COMBINATION COUNT | DATA COMBINATION | APPROXIMATE LINE | ACCURACY |
|---|---|---|---|---|
| $c_1$ | 10 | $S_4, S_5, S_6, S_7, S_8, S_{16}, S_{17}, S_{18}, S_{19}, S_{20}$ | $Y=a_1X+b_1$ | $d_1$ |
| $c_2$ | 8 | $S_3, S_9, S_{10}, S_{11}, S_{14}, S_{21}, S_{22}, S_{23}$ | $Y=a_2X+b_2$ | $d_2$ |
| $c_3$ | 6 | $S_0, S_1, S_2, S_{12}, S_{13}, S_{15}$ | $Y=a_3X+b_3$ | $d_3$ |

INFORMATION PROCESSING DEVICE AND CLUSTERING METHOD

CROSS REFERENCE TO RELATED APPLICATIONS

This application is a National Stage of International Application No. PCT/JP2015/001101 filed Mar. 3, 2015, claiming priority based on Japanese Patent Application No. 2014-054451, filed Mar. 18, 2014, the contents of all of which are incorporated herein by reference in their entirety.

TECHNICAL FIELD

The present invention relates to an information processing device and a clustering method.

BACKGROUND ART

Processing for analyzing a large amount of data of a plurality of types are being performed on a wide variety of systems today. For example, combinations of data of types that are highly related to one another are extracted from among data of a plurality of types, and the extracted combinations of data are used to perform statistical processing or prediction processing. If data to be analyzed contains data having different characteristics, the accuracy of the analytical processing will be decreased or the analysis will be impossible.

Consider, for example, analysis of the relationship between an input packet rate and a central processing unit (CPU) utilization rate in a computer system by using an approximate line obtained by a least-square method or the like. If the computer system performs operations that are different between day and night, such as performing business processing during the daytime and batch processing during the night-time, there will be a significant difference in CPU utilization rate with respect to the input packet rate between day and night. In this case, an approximate line obtained from the mixture of daytime data and nighttime data is likely to be unfit for actual operation of the system.

Such analytical processing therefore requires classification (clustering) of data to be analyzed into clusters each of which includes data having the same characteristic by taking into consideration the characteristic of the data in advance.

A technique relating to such clustering in analytical processing is disclosed in PTL1, for example, which is a capacity management support apparatus that calculates a distribution density function for data combinations of particular types to classify data to be analyzed. NPL1 also discloses a technique that uses cross validation or Bayesian estimation to extract combinations that are in a close relation among data of a plurality of types and classify the data.

A related technique is disclosed in PTL2 which is an operation management apparatus that predicts an item of performance information concerning a system from another item of performance information on the basis of a correlation model of the system. PTL3 discloses another related technique which is an image data classifying apparatus that classifies image data on the basis of a plurality of types of distance definitions.

CITATION LIST

Patent Literature

[PTL1] International Patent Publication WO 2013/128789
[PTL2] Japanese Patent No. 5141789
[PTL3] Japanese Patent Application Laid-open Publication No. 2003-242160

Non-Patent Literature

[NPL1] Fujimaki and Morinaga, "The Most Advanced Data Mining of the Big Data Era", NEC Technical Journal, NEC Corporation, September 2013, Vol. 65, No. 2/2012, pp. 81-85

SUMMARY OF INVENTION

Technical Problem

However, the techniques disclosed in PTL1 and PTL2 require calculation of distribution density functions for data to be analyzed or analysis using cross validation or Bayesian estimation. Accordingly, these techniques have a problem that it takes much time to classify data due to a high processing load.

An object of the present invention is to solve the problem described above and provide an information processing device and a clustering method which provide fast classification of data according to characteristics.

Solution to Problem

An information processing device according to an exemplary aspect of the invention includes: a data storage means for storing a plurality of data sets; and a cluster generation means for generating an approximate line that approximates as many data sets as possible within a predetermined margin of error among the plurality of data sets in a space in which the plurality of data sets are arranged in accordance with data values, and generating a cluster by classifying the plurality of data sets based on the generated approximate line and outputting the generated cluster.

An clustering method according to an exemplary aspect of the invention includes: storing a plurality of data sets; and generating an approximate line that approximates as many data sets as possible within a predetermined margin of error among the plurality of data sets in a space in which the plurality of data sets are arranged in accordance with data values, and generating a cluster by classifying the plurality of data sets based on the generated approximate line and outputting the generated cluster.

A computer readable storage medium according to an exemplary aspect of the invention records thereon a program, causing a computer to perform a method including: storing a plurality of data sets; and generating an approximate line that approximates as many data sets as possible within a predetermined margin of error among the plurality of data sets in a space in which the plurality of data sets are arranged in accordance with data values, and generating a cluster by classifying the plurality of data sets based on the generated approximate line and outputting the generated cluster.

Advantageous Effects of Invention

Advantageous effects of the present invention is that fast classification of data can be performed according to characteristics.

BRIEF DESCRIPTION OF DRAWINGS

FIG. 4 is a diagram illustrating examples of data sequences to be analyzed in the exemplary embodiment of the present invention.

FIG. 5 is a diagram illustrating exemplary data combinations in the exemplary embodiment of the present invention.

FIG. 7 is a diagram illustrating exemplary cluster information 501 in the exemplary embodiment of the present invention.

DESCRIPTION OF EMBODIMENTS

Figure 2:
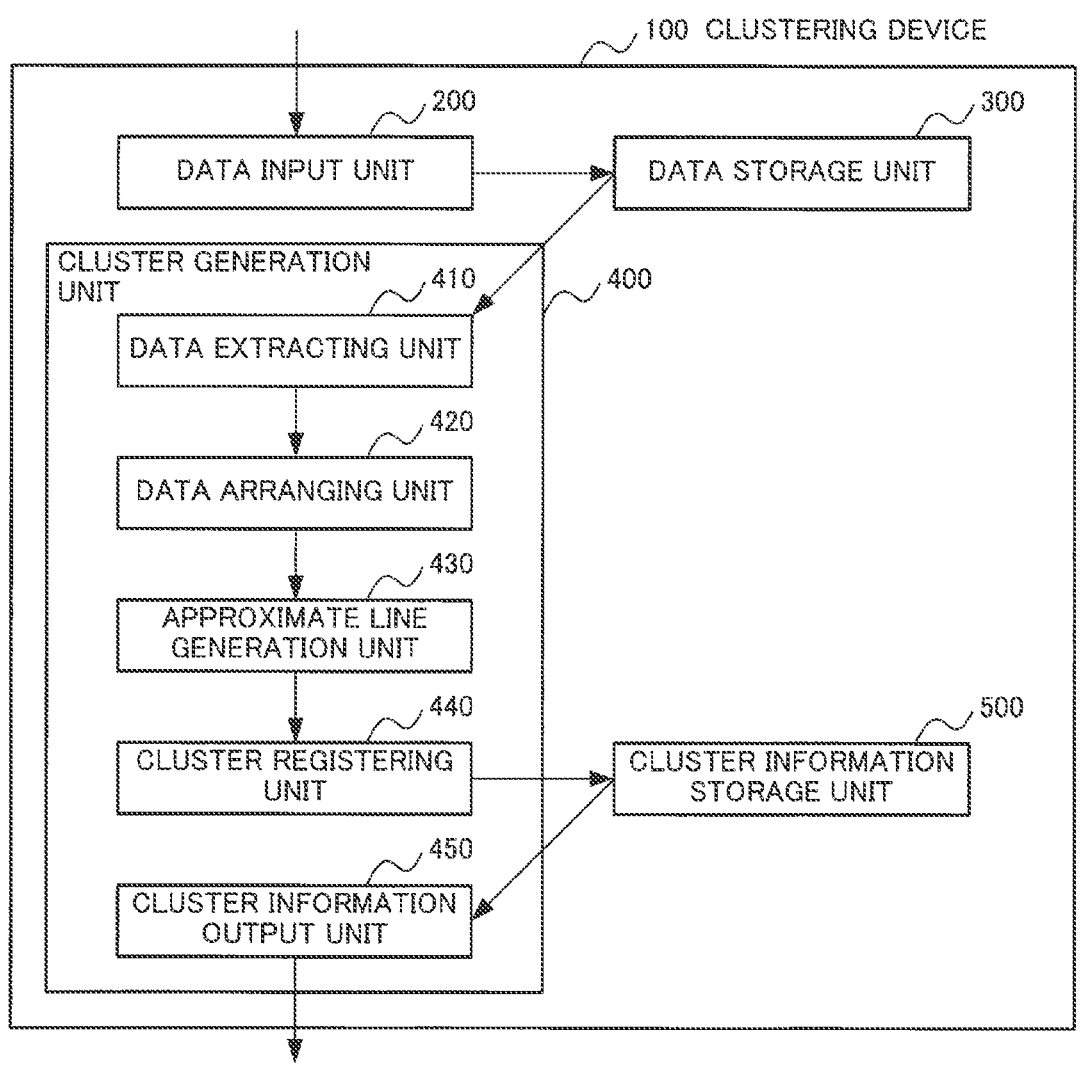
FIG. 2 is a block diagram illustrating a configuration of a clustering device 100 in the exemplary embodiment of the present invention.

A configuration of an exemplary embodiment of the present invention will be described first. FIG. 2 is a block diagram illustrating a configuration of a clustering device 100 in the exemplary embodiment of the present invention. The clustering device 100 is one exemplary embodiment of an information processing device of the present invention.

The clustering device 100 includes a data input unit 200, a data storage unit 300, a cluster generation unit 400, and a cluster information storage unit 500.

The data input unit 200 receives, from a user or the like, inputs of data sequences of a plurality of types that are to be analyzed. In the exemplary embodiment of the present invention, data time sequences relating to the performance of a computer system, such as an input packet rate and CPU utilization rate in the computer system, are used as data sequences.

The data storage unit 300 stores data sequences of a plurality of types.

The cluster generation unit 400 classifies combinations of data (data combinations) of two types among a plurality of types according to characteristics to generate clusters.

The cluster generation unit 400 includes a data extracting unit 410, a data arranging unit 420, an approximate line generation unit 430, a cluster registering unit 440 and a cluster information output unit 450.

The data extracting unit 410 extracts a plurality of data combinations of data sequences of two types from among a plurality of types.

The data arranging unit 420 arranges the extracted data combinations in a two-dimensional space to generate a data combination image 421.

The approximate line generation unit 430 generates an approximate line that approximates as many data combinations as possible among a plurality of data combinations within a predetermined margin of error on the basis of the data combination image 421.

The cluster registering unit 440 generates a cluster based on the generated approximate line and registers the generated cluster in cluster information 501.

The cluster information output unit 450 outputs the cluster information 501 to a user or the like.

The cluster information storage unit 500 stores the cluster information 501.

Note that the clustering device 100 may be a computer that includes a CPU and a storage medium on which a program is stored and operates under the control based on the program. In this case, the CPU of the clustering device 100 executes a computer program for implementing the functions of the data input unit 200 and the cluster generation unit 400. The storage medium of the clustering device 100 stores information of the data storage unit 300 and the cluster information storage unit 500. The data storage unit 300 and the cluster information storage unit 500 may be implemented by separate storage media or a single storage medium.

Next, the operation of the exemplary embodiment of the present invention will be described.

FIG. 4 is a diagram illustrating exemplary data sequences to be analyzed in the exemplary embodiment of the present invention. The example in FIG. 4 illustrates data sequences $x_0, x_1, \ldots, x_{23}$ and $y_0, y_1, \ldots, y_{23}$ of two types X and Y, acquired every two hours in the period between time "2014, Feb. 1 00:00" and time "2014, Feb. 2 22:00". Here, X and Y represent the input packet rate (hereinafter also simply referred to as the "input") and the CPU utilization rate, respectively, of a computer system.

It is assumed here that data sequences illustrated in FIG. 4 have been input through the data input unit 200 and stored in the data storage unit 300.

Figure 3:
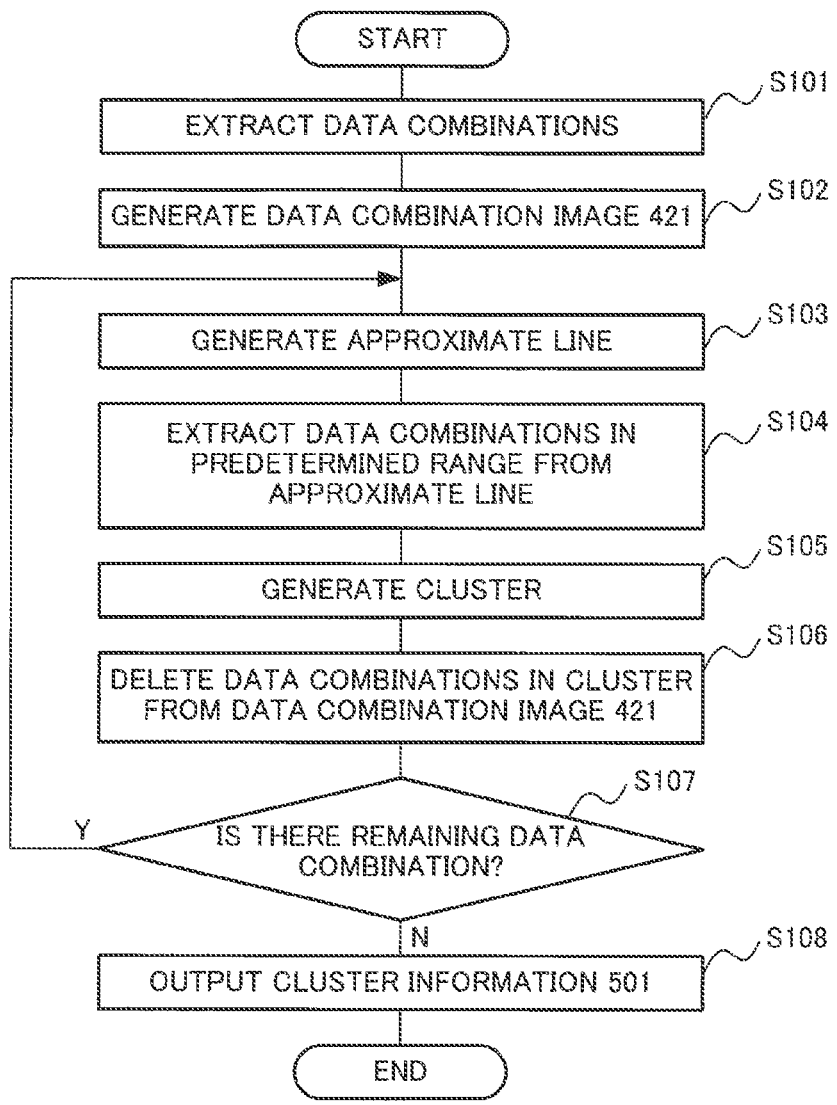
FIG. 3 is a flowchart illustrating operation of the clustering device 100 in the exemplary embodiment of the present invention.

FIG. 3 is a flowchart illustrating the operation of the clustering device 100 in the exemplary embodiment of the present invention.

First, the data extracting unit 410 extracts data combinations of data sequences of two types stored in the data storage unit 300 (step S101). For example, the data extracting unit 410 extracts data combinations each of which is acquired at the same time instant. Note that the data extracting unit 410 may use a common attribute other than the time associated with data, such as a particular event, to extract data combinations.

FIG. 5 is a diagram illustrating exemplary data combinations in the exemplary embodiment of the present invention.

For example, as illustrated in FIG. 5, the data extracting unit 410 extracts combinations $s_0, s_1, \ldots, s_{23}$ of X (inputs) and Y (CPU utilization rates) at the same time instants from the data sequences in FIG. 4.

The data arranging unit 420 arranges the extracted data combinations in a two-dimensional space to generate a data combination image 421 (step S102). The data arranging unit 420 generates the data combination image 421 by arranging points representing the data combinations at positions corresponding to the values of data included in the data combinations in a space using each of the types of data sequences as a dimension.

Figure 6:
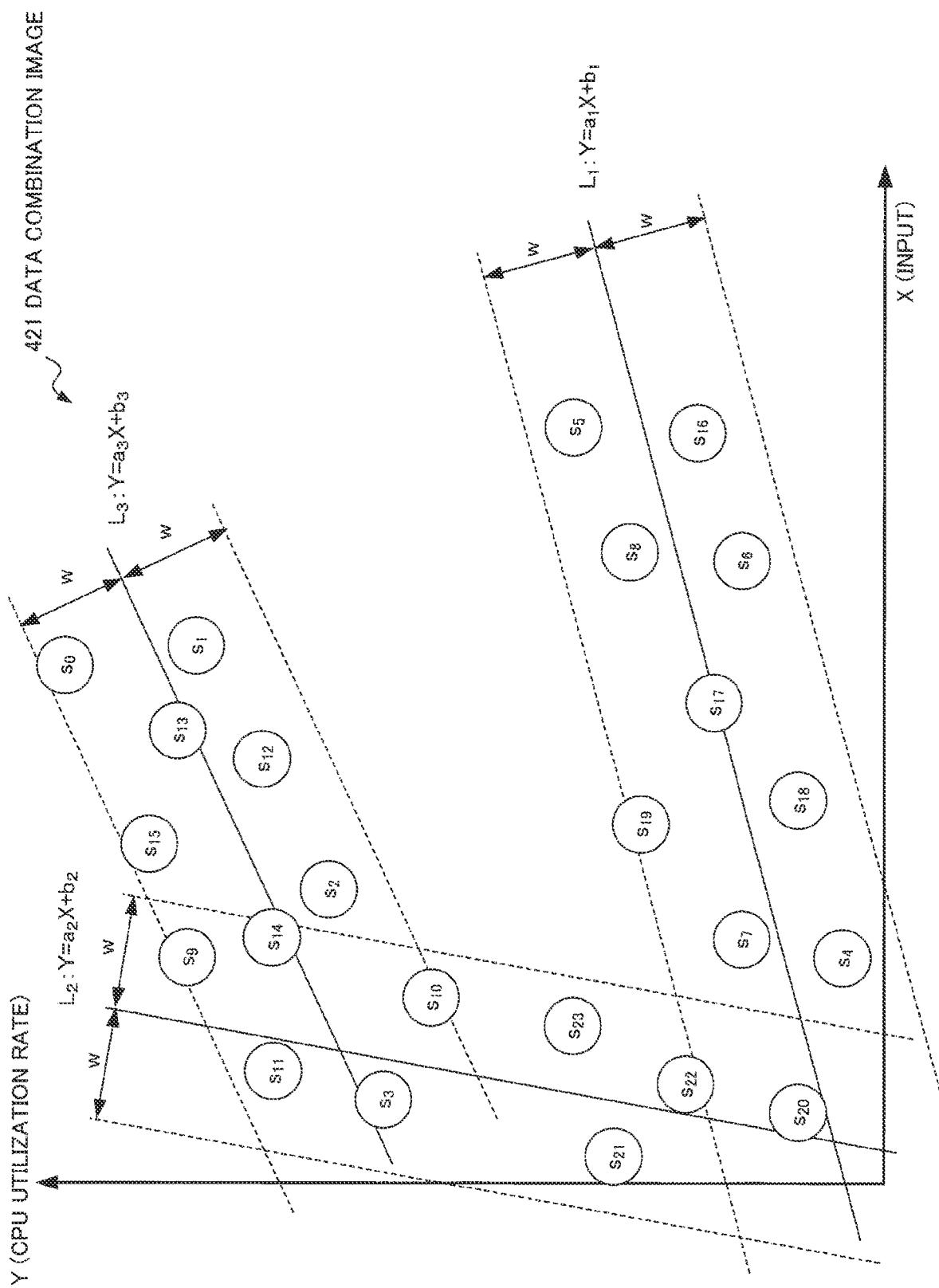
FIG. 6 is a diagram illustrating an exemplary data combination image 421 in the exemplary embodiment of the present invention.

FIG. 6 is a diagram illustrating an exemplary data combination image 421 in the exemplary embodiment of the present invention.

For example, the data arranging unit 420 arranges the data combinations $s_0, s_1, \ldots, s_{23}$ in a two-dimensional space having the X (input) axis and Y (CPU utilization rate) axis to generate the data combination image 421 as illustrated in FIG. 6.

The approximate line generation unit 430 generates an approximate line that approximates as many data combinations as possible among a plurality of data combinations within a predetermined margin of error in the data combination image 421 (step S103). Note that in the exemplary embodiment of the present invention, straight lines are used as approximate lines.

The approximate line generation unit 430 generates an approximate line by using, for example, the Hough transform, which is a technique for detecting lines in image processing. In the Hough transform, an approximate line that passes through points representing data combinations is represented in a polar coordinate space ($\theta$, $\rho$). Here, $\theta$ is the angle between the X axis and the normal to the approximate line (straight line) and $\rho$ is the distance from the origin to the approximate line. In the Hough transform, a quantized value of $\rho$ is calculated while changing a quantized value of $\theta$ for each of the points, and a set of $\theta$ and $\rho$ which is the same for as many points as possible is extracted by voting. In the Hough transform, an error between an approximate line represented by $\theta$, $\rho$ and each of the points approximated by the approximate line is dependent on quantization errors in $\theta$ and $\rho$. Accordingly, it can be considered that a quantization step size determines an error in the approximate line (a predetermined margin of error).

For example, the approximate line generation unit 430 generates a line $L_1$ in the data combination image 421 in FIG. 6 by the Hough transform.

Note that the approximate line generation unit 430 may use any method other than the Hough transform to generate an approximate line, as long as the method can generate an approximate line that approximates as many combinations as possible among a plurality of data combinations within a predetermined margin of error in the data combination image 421.

The cluster registering unit 440 extracts data combinations that exist in a predetermined range from the generated approximate line (step S104).

For example, the cluster registering unit 440 extracts data combinations $s_4$ to $s_8$ and $s_{16}$ to $s_{20}$ within a width W from the line $L_1$ in the data combination image 421 in FIG. 6.

The cluster registering unit 440 generates a cluster having the extracted data combinations as its elements and registers the cluster in the cluster information 501 (step S105). The cluster registering unit 440 registers the number of the extracted data combinations, parameters (slope, intercept) of the generated approximate line and the accuracy of the approximate line together with identifiers of the extracted data combinations. The accuracy of the approximate line can be calculated from the distribution of the extracted data combinations around the approximate line.

FIG. 7 is a diagram illustrating an example of cluster information 501 in the exemplary embodiment of the present invention. Each piece of the cluster information 501 includes an identifier of a cluster ("CLUSTER"), the number of the data combinations in the cluster ("NUMBER OF COMBINATIONS"), identifiers of the data combinations ("DATA COMBINATION"), parameters of the approximate line ("APPROXIMATE LINE"), and the accuracy of the approximate line ("ACCURACY").

For example, the cluster registering unit 440 registers the number of combinations "10", data combinations "$s_4$ to $s_8$, $s_{16}$ to $s_{20}$", an approximate line "$Y=a_1X+b_1$", and accuracy "$d_1$", in the piece of cluster information 501 for a cluster "$c_1$", as illustrated in FIG. 7.

The cluster registering unit 440 deletes the data combinations registered in the cluster from the data combination image 421 (step S106).

The cluster registering unit 440 repeats the process from step S103 predetermined times or until there are no data combinations (step S107).

For example, the data arranging unit 420 generates a line $L_2$ in the image obtained by the deletion of the data combinations $s_4$ to $s_8$, $s_{16}$ to $s_{20}$ from the data combination image 421 in FIG. 6. The cluster registering unit 440 extracts data combinations $s_3$, $s_9$ to $s_{11}$, $s_{14}$, $s_{21}$ to $s_{23}$ within the width W from the line $L_2$. The cluster registering unit 440 then registers the number of the combinations "8", the data combinations "$s_3$, $s_9$ to $s_{11}$, $s_{14}$, $s_{21}$ to $s_{23}$", the approximate line "$Y=a_2X+b_2$" and the accuracy "$d_2$" in the cluster information 501 for the cluster "$c_2$" as illustrated in FIG. 7.

Furthermore, the data arranging unit 420 generates a line $L_3$ in the image obtained by deletion of the data combinations $s_4$ to $s_8$, $s_{16}$ to $s_{20}$ and $s_3$, $s_9$ to $s_{11}$, $s_{14}$, $s_{21}$ to $s_{23}$ from the data combination image 421 in FIG. 6. The cluster registering unit 440 extracts data combinations $s_0$ to $s_2$, $s_{12}$, $s_{13}$, $s_{15}$ within the width W from the line $L_3$. The cluster registering unit 440 then registers the number of combinations "6", the data combinations "$s_0$ to $s_2$, $s_{12}$, $s_{13}$, $s_{15}$", the approximate line "$Y=a_3X+b_3$" and the accuracy "$d_3$" in the cluster information 501 for the cluster "$c_3$" as illustrated in FIG. 7.

The cluster information output unit 450 outputs the cluster information 501 to a user or the like (step S108). For example, the cluster information output unit 450 outputs the cluster information 501 through a displaying device (not depicted) such as a display.

Figure 8:
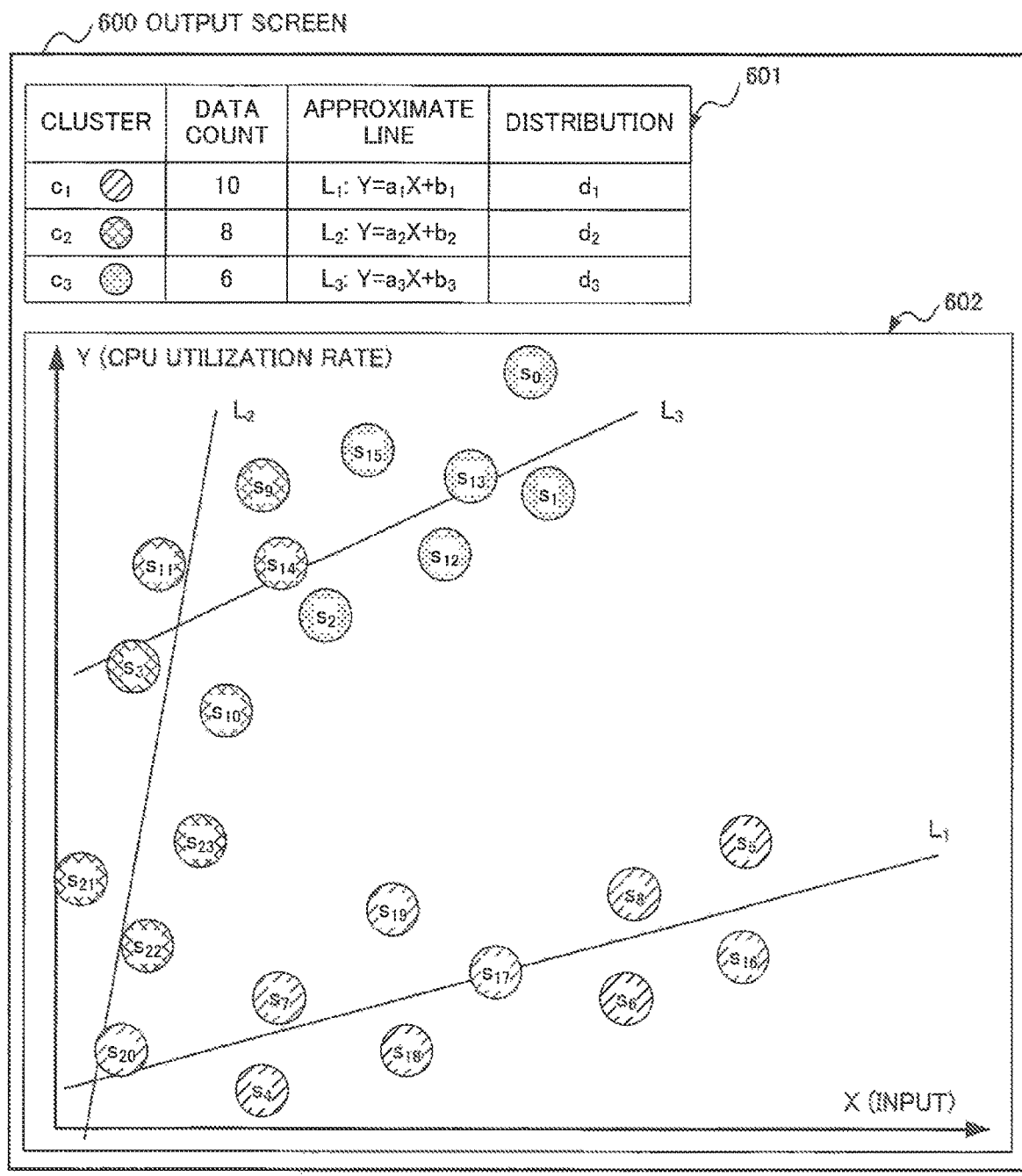
FIG. 8 is a diagram illustrating an exemplary output screen 600 in the exemplary embodiment of the present invention.

FIG. 8 is a diagram illustrating an exemplary output screen 600 in the exemplary embodiment of the present invention. In the example in FIG. 8, the output screen 600 includes a cluster information display region 601 and a data combination image display region 602. The cluster information 501 is displayed in the cluster information display region 601. The data combination image 421 is displayed in the data combination image display region 602. In the data combination image display region 602, data combinations are classified into clusters and are displayed along with approximate lines.

Note that the cluster information output unit 450 may send the cluster information 501 to another device as a data file.

A user or the like can use the data combinations included in each cluster in the output cluster information 501 as a result of data classification.

Furthermore, an analyzing unit, not depicted, provided in the clustering device 100 or an analyzer or the like, not depicted, that is connected to the clustering device 100 may perform analytical processing such as prediction of a value of data of one type from a value of data of the other type by using the approximate line for each cluster.

For example, an analyzing unit, an analyzer or the like may predict a range of variations in the value of the CPU utilization rate with respect to a range of variations in the value of an input by using the approximate line of each cluster in the cluster information 501 in FIG. 7.

In this case, the analyzing unit, the analyzer or the like makes predictions using the approximate line of a cluster specified by a user or the like, for example. For example, the user or the like considers a cluster that includes many combinations or a cluster that has an approximate line with a high degree of accuracy to be a reliable cluster on the basis of the output cluster information 501 and specifies the cluster. Alternatively, the user or the like considers clusters that have approximate lines with large and small slopes to be noise and specifies a cluster that has an approximate line with a slope within a predetermined range.

The cluster information output unit 450 may rearrange pieces of information relating to clusters in the cluster information 501 in descending order of the number of combinations, the accuracy, or slope of approximate line and may output the rearranged pieces of information for allowing a user or the like to select a cluster. The cluster information output unit 450 may extract and output clusters that have numbers of combinations that are equal to or greater than a predetermined threshold or degrees of accuracy that are equal to or greater than a predetermined threshold from among the clusters included in the cluster information 501. Alternatively, the cluster information output unit 450 may extract and output clusters that have approximate lines with slopes within a predetermined range from among the clusters included in the cluster information 501.

Note that on behalf of a user or the like, an analyzing unit, an analyzer or the like may select a cluster that has many combinations, a cluster that has an approximate line with a high degree of accuracy, or a cluster that has an approximate line with a predetermined range of slope, and may make predictions.

Furthermore, an analyzing unit, an analyzer or the like may output the accuracy of an approximate line as the accuracy of prediction by an approximate line along with a result of prediction.

Moreover, an analyzing unit, an analyzer or the like may use attributes associated with clusters to group new pieces of data and may perform analytical processing of the classified pieces of data. For example, if a plurality of data combinations that belong to each cluster were acquired in the same time period, an analyzing unit, an analyzer or the like may make a correlation analysis of new data in the time period associated with each cluster as described in PTL2, for example.

In this case, an attribute to be associated with each cluster is specified by a user or the like, for example. The user or the like specifies an attribute that is common to the data combinations belonging to each cluster as the attribute to be associated with the cluster on the basis of output cluster information 501.

In order that a user or the like can identify the attribute that is common to the data combinations belonging to each cluster, the cluster information output unit 450 may output the cluster to which each data combination belongs in association with the attribute of the data combination.

Figure 9:
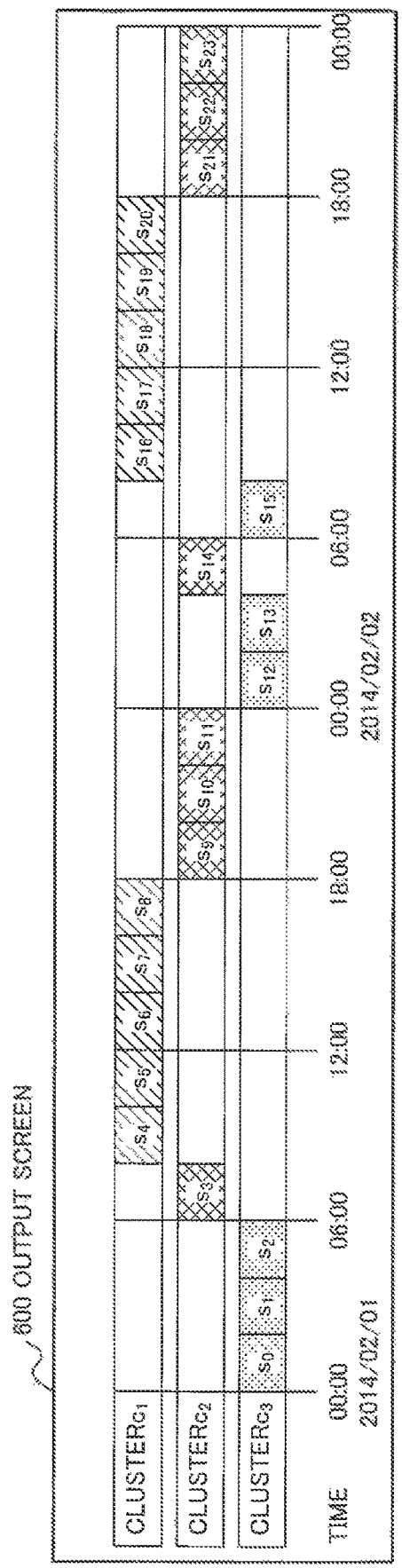
FIG. 9 is a diagram illustrating another exemplary output screen 600 in the exemplary embodiment of the present invention.

FIG. 9 is a diagram illustrating another exemplary output screen 600 in the exemplary embodiment of the present invention. In the example in FIG. 9, clusters to which data combinations belong are illustrated as being associated with time periods in which the data combinations were acquired. This allows the user or the like to readily know that clusters "$c_1$", "$c_2$", and "$c_3$" are clusters that are related to the daytime, evening and nighttime, respectively, for example.

Note that on behalf of a user or the like, an analyzing unit, an analyzer or the like may identify the attribute that is common to the data combinations belonging to each cluster, may associate the attribute with the cluster and may perform classification and statistical processing of new data.

When data sequences of a plurality of types are stored in the data storage unit 300, steps S101 through S108 may be repeated for each of different combinations of data sequences of two types.

Then the operation of the exemplary embodiment of the present invention ends.

Figure 1:
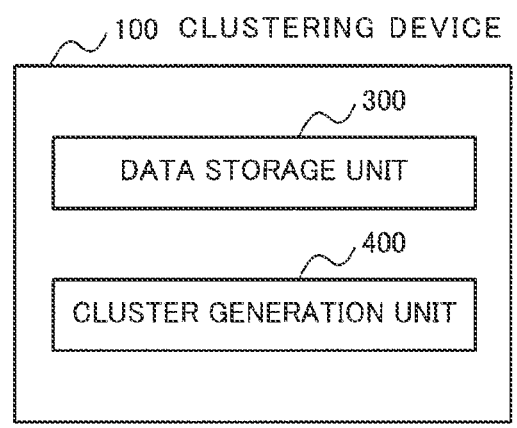
FIG. 1 is a block diagram illustrating a characteristic configuration of an exemplary embodiment of the present invention.

Next, a characteristic configuration of the exemplary embodiment of the present invention will be described. FIG. 1 is a block diagram illustrating a characteristic configuration of the exemplary embodiment of the present invention Referring to FIG. 1, a clustering device 100 (information processing device) in the exemplary embodiment of the present invention includes a data storage unit 300 and a cluster generation unit 400.

The data storage unit 300 stores a plurality of data sets. The cluster generation unit 400 generates an approximate line that approximates as many data sets as possible within a predetermined margin of error among the plurality of data sets in a space in which the plurality of data sets are arranged in accordance with data values. The cluster generation unit 400 generates a cluster by classifying the plurality of data sets based on the generated approximate line and outputs the generated cluster.

According to the exemplary embodiment of the present invention, fast classification of data can be performed according to characteristics. This is because the cluster generation unit 400 generates an approximate line that approximates as many data combinations as possible within a predetermined margin of error in a space in which data combinations are arranged and generates a cluster based on the generated approximate line. The load of calculating an approximate line can be reduced, for example, by appropriately setting an allowable margin of error, such as quantization errors in the Hough transform. This can reduce the load of clustering and enables fast clustering as compared with an analysis that involves calculation of a distribution density function or an analysis that uses cross validation or Bayesian estimation in a technique of PTL1 and PTL2.

Furthermore, exhaustive and real-time clustering of data combinations of different types can be performed even when there are many types of data or a large number of data combinations.

According to the exemplary embodiment of the present invention, an approximation equation representing the relationship with respect to data combinations included in a cluster can be generated simultaneously with clustering. This is because the approximate line generation unit 430 generates an approximate line as described above.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

For example, while straight lines are used as approximate lines in the exemplary embodiment of the present invention, lines that have any other shapes, such as circles, quadratic function curves, or logarithmic function curves, may be used as approximate lines, as long as the lines can approximate the relationship with respect to data combinations.

Furthermore, combinations of two types of data are arranged in a two-dimensional space to generate a data combination image 421 and approximate lines are generated on the data combination image 421 in the exemplary embodiments of the present invention. However, clusters for classifying combinations of n types of data (where n is an integer equal to or greater than 2) may be generated by extracting approximate lines from an n-dimensional space in which combinations of n types of data are arranged in a way similar to that descried above. In this case, an analyzing unit, an analyzer or the like may use approximate lines to perform analytical processing such as prediction of values of data of n−1 types from values of data of one type among n types, for example.

For example, when a cluster is generated for a combination of three types of data, an analyzing unit, an analyzer or the like uses an approximate line for each cluster to predict a range of variations in values of data of two of the types that are used as outputs with respect to a range of variations in a value of data of the other type used as an input.

Furthermore, if a range of data values of a certain type varies from one approximate line to another, an analyzing unit, an analyzer or the like may narrow down approximate lines to be used in prediction in accordance with values of data of the type.

Data to be analyzed in the exemplary embodiment of the present invention is data concerning the performance of a computer system, such as the input packet rate and CPU utilization rate in the computer system. However, data to be analyzed may be any items of data that relate to each other, such as data acquired with various sensors, besides data concerning the performance of a computer.

This application is based upon and claims the benefit of priority from Japanese Patent Application No. 2014-054451, filed on Mar. 18, 2014, the disclosure of which is incorporated herein in its entirety by reference.

REFERENCE SIGNS LIST

100 Clustering device
200 Data input unit
300 Data storage unit
400 Cluster generation unit
410 Data extracting unit
420 Data arranging unit
421 Data combination image
430 Approximate line generation unit
440 Cluster registering unit
450 Cluster information output unit
500 Cluster information storage unit
501 Cluster information
600 Output screen
601 Cluster information display region
602 Data combination image display region

The invention claimed is:

1. An information processing device comprising:
at least one memory configured to store instructions; and
at least one processor configured to execute the instructions to:
store a plurality of data sets relating to performance of a computer system, wherein the plurality of data sets includes at least two types of data;
generate an approximate line representing as many data sets as possible within a predetermined margin of error among the plurality of data sets in a space having dimensions respectively corresponding to the types of data;
generate a cluster by classifying data sets that exist in a predetermined range from the generated approximate line among the plurality of data sets into the cluster;
identify an attribute being common to the data sets belonging to the cluster; and
output the generated cluster, associated with the identified attribute, to a display.

2. The information processing device according to claim 1, wherein
the at least one processor is further configured to execute the instructions to generate a plurality of clusters by repeating generation of an approximate line and generation of a cluster for data sets obtained by excluding the data sets which has been classified into the generated cluster from the plurality of data sets.

3. The information processing device according to claim 1, wherein
the at least one processor is further configured to execute the instructions to output the generated cluster together with an approximation equation representing the approximate line of the cluster.

4. The information processing device according to claim 1, wherein
at least one processor is further configured to execute the instructions to output an attribute of each of the plurality of data sets and the cluster into which the data set is classified in association with each other.

5. The information processing device according to claim 1, wherein
the at least one processor is further configured to execute the instructions to generate the approximate line by using Hough transform.

6. The information processing device according to claim 1, wherein the at least one processor is further configured to execute the instructions to:
predict a value of one type from a value of the other type by using the generated approximate line.

7. A clustering method comprising:
generating an approximate line representing as many data sets as possible within a predetermined margin of error among a plurality of data sets relating to performance of a computer system, wherein the plurality of data sets includes at least two types of data in a space having dimensions respectively corresponding to the types of data;
generating a cluster by classifying data sets that exist in a predetermined range from the generated approximate line among the plurality of data sets into the cluster;
identifying an attribute being common to the data sets belonging to the cluster; and
outputting the generated cluster, associated with the identified attribute, to a display.

8. The clustering method according to claim 7, wherein a plurality of clusters are generated by repeating the generating an approximate line and the generating a cluster for data sets obtained by excluding the data sets which has been classified into the generated cluster from the plurality of data sets.

9. The clustering method according to claim 7, wherein, in the outputting the generated cluster, the generated cluster is outputted together with an approximation equation representing the approximate line of the cluster.

10. The clustering method according to claim 7, wherein, in the outputting the generated cluster, an attribute of each of the plurality of data sets and the cluster into which the data set is classified are outputted in association with each other.

11. The clustering method according to claim 7, wherein, in the generating a cluster, the approximate line is generated by using Hough transform.

12. A non-transitory computer readable storage medium recording thereon a program, causing a computer to perform a method comprising:
generating an approximate line representing as many data sets as possible within a predetermined margin of error among a plurality of data sets relating to performance of a computer system, wherein the plurality of data sets includes at least two types of data in a space having dimensions respectively corresponding to the types of data;

generating a cluster by classifying data sets that exist in a predetermined range from the generated approximate line among the plurality of data sets into the cluster;

identifying an attribute being common to the data sets belonging to the cluster; and outputting the generated cluster, associated with the identified attribute, to a display.

13. The non-transitory computer readable storage medium recording thereon the program according to claim 12, wherein a plurality of clusters are generated by repeating the generating an approximate line and the generating a cluster for data sets obtained by excluding the data sets which has been classified into the generated cluster from the plurality of data sets.

14. The non-transitory computer readable storage medium recording thereon the program according to claim 12, wherein, in the outputting the generated cluster, the generated cluster is outputted together with an approximation equation representing the approximate line of the cluster.

15. The non-transitory computer readable storage medium recording thereon the program according to claim 12, wherein, in the outputting the generated cluster, an attribute of each of the plurality of data sets and the cluster into which the data set is classified are outputted in association with each other.

16. The non-transitory computer readable storage medium recording thereon the program according to claim 12, wherein, in the generating a cluster, the approximate line is generated by using Hough transform.

* * * * *

UNITED STATES PATENT AND TRADEMARK OFFICE
CERTIFICATE OF CORRECTION

PATENT NO. : 10,642,864 B2
APPLICATION NO. : 15/126316
DATED : May 5, 2020
INVENTOR(S) : Kentarou Yabuki Page 1 of 1

It is certified that error appears in the above-identified patent and that said Letters Patent is hereby corrected as shown below:

In the Claims

Column 10, Line 9; In Claim 4, before "at least", insert --the--

Signed and Sealed this
Seventeenth Day of November, 2020

Andrei Iancu
*Director of the United States Patent and Trademark Office*